United States Patent
Wilson et al.

(10) Patent No.: US 9,555,335 B1
(45) Date of Patent: Jan. 31, 2017

(54) MOBILE ZIP LINE AMUSEMENT RIDE

(71) Applicant: High Velocity Designs, LLC, Newcastle, CA (US)

(72) Inventors: Jeffrey Dean Wilson, Newcastle, CA (US); Christopher Ryan Resnicke, Lincoln, CA (US)

(*) Notice: Subject to any disclaimer, the term of this patent is extended or adjusted under 35 U.S.C. 154(b) by 0 days.

(21) Appl. No.: 14/075,644

(22) Filed: Nov. 8, 2013

Related U.S. Application Data

(60) Provisional application No. 61/723,809, filed on Nov. 8, 2012.

(51) Int. Cl.
| A63G 21/22 | (2006.01) |
|---|---|
| G01B 21/02 | (2006.01) |
| G01D 5/00 | (2006.01) |

(52) U.S. Cl.
CPC .............. A63G 21/22 (2013.01); G01B 21/02 (2013.01); G01D 5/00 (2013.01)

(58) Field of Classification Search
CPC ...................................... A63G 21/22
USPC ................................ 104/113, 117
See application file for complete search history.

(56) References Cited

U.S. PATENT DOCUMENTS

| 535,938 | A | * | 3/1895 | Boyton | A63G 21/18 104/113 |
|---|---|---|---|---|---|
| 3,713,547 | A | * | 1/1973 | Beck | E21B 19/155 104/112 |
| 4,212,576 | A | * | 7/1980 | George | E21B 19/155 104/112 |
| 6,666,773 | B1 | * | 12/2003 | Richardson | F16D 63/008 104/204 |
| 7,299,752 | B1 | * | 11/2007 | Cylvick | B61B 7/02 104/112 |
| 7,309,302 | B1 | * | 12/2007 | Phillips | A63C 19/10 472/116 |
| 2010/0144493 | A1 | * | 6/2010 | Wilson | A63B 9/00 482/35 |
| 2011/0162917 | A1 | * | 7/2011 | Steele | A63G 21/22 188/65.2 |
| 2012/0125220 | A1 | * | 5/2012 | Checketts | A63G 21/22 104/53 |

* cited by examiner

*Primary Examiner* — Zachary Kuhfuss
(74) *Attorney, Agent, or Firm* — Pate Baird, PLLC

(57) ABSTRACT

The present invention relates to a zip-line ride system. The zip-line ride system may consist of a tower and an anchor connected by a cable. The anchor may be fixed or temporary, allowing for a zip-line ride that may be portable. The zip-line ride system may also allow for an adjustment to the height, length, tension, or any combination of all three, of the cable.

18 Claims, 14 Drawing Sheets

MOBILE ZIP LINE AMUSEMENT RIDE

RELATED APPLICATIONS

This application claims the benefit of U.S. Provisional Patent Application Ser. No. 61/723,809 filed on Nov. 8, 2012 and entitled, "MOBILE ZIP LINE AMUSEMENT RIDE," which is hereby incorporated by reference in its entirety.

BACKGROUND

The Field of the Invention

The invention relates to amusement systems commonly referred to as "zip lines" and the systems governing their use.

Background

A zip line amusement ride is a common attraction. Typically, it may consist of a rope or cable permanently affixed at some angle of declination, with platforms at either end to allow the participant (or rider) a place to connect and disconnect a trolley from the cable. These cables can range from fifty (50) feet to more than a mile long. The participant travels down the cable and comes to a stop at the lower platform. Generally, these attachment points are some sort of tower, rock face, or tree. Zip lines may be arranged in series, so that one zip line ends near the beginning of another.

BRIEF SUMMARY OF THE INVENTION

The present invention or system described herein may include a zip line that can be readily assembled and disassembled in a variety of conditions. It is made in such a way as to allow the unit to be used in an area of relatively flat terrain. The system length can be varied from a minimum of one hundred (100) feet to a maximum of three hundred and twenty (320) feet or more.

In one embodiment, a tower may be permanently affixed to a trailer, a spiral staircase within the tower, cables to function as the zip line, a portable anchor for immobilizing the lower zip line attachment point, a system to vary the height of the zip line, a system to vary the tension of the zip line, a system to monitor the tension of the zip line, a system to communicate safety conditions to the tower, and lanyards to attach participants to trolleys that roll along the zip line. In one embodiment, the invention may also have the ability to attach an inflatable slide that acts as an alternative exit for participants from the zip line tower, as well as acting as a backup pad for participants in the case of some form of failure of the cable.

In one embodiment, these systems may be preferably assembled to allow one or many individuals to easily erect the invention, use it in a safe manner, and break down the invention for transport within a reasonable period. A control system may be provided to monitor and manage safety conditions, so as to remove the chance of accident due to human error.

In one embodiment, a self-standing zip line system that is readily capable of being transported to a new location may include a tower capable of being raised and lowered through some mechanized process, a system capable of acting as a temporary anchor for a zip line, and a method of easily transporting the whole system, which could include one trailer capable of transporting the whole system, multiple trailers, each carrying a specific part of the system, or adding features to the system such that it can be pulled behind a vehicle.

A trailer may be constructed with a substantial gap within its structure so as to eliminate loading/unloading issues, which may include a trailer with a track system, or a trailer with alignment features to force the item that is loading/unloading into a specific area within the trailer.

A temporary zip line system that can be assembled and used without the use of any external features including but not limited to vehicles, permanent structures, and/or stakes. A zip line system that can be used on surfaces such as asphalt, concrete, cement, brick, dirt, grass, sand, snow, ice, etc.

A connecting device, or lanyard, with some or all of the following characteristics: two separate points to attach to the zip line trolley; permanently affixed mechanisms that have the purpose of attaching to a single point on the cable or zip line trolley for the purposes or redundancy; a single handle to rapidly adjust the length on a per-person basis (one size fits all); has the purpose of maintaining the distance between the attachment cable and the participant or rider; used on zip lines, hiking, safety line attachment, ropes courses, etc.; designed to be used with the Speed Harness™; and is safety rated for use as a life line.

A zip line tower having some or all of the following characteristics: a spiral staircase; a hydraulic, mechanical, electrical, or manual system to raise/lower it; an inflatable slide attached that doubles as a fall protection pad; an alternative exit that also acts as entertainment for those who choose not to participate in the zip line; doors that automatically unlock when the zip line cable is safe to use; and doors that automatically open when the zip line cable is safe to use.

A device that clamps onto an existing rope, wire rope, synthetic rope, or cable that adds an additional anchoring point, perhaps including a device that does so without introducing a weak point into the rope or cable.

A device capable of doing some or all of the following: varying the height of a zip line; varying the tension of a zip line; varying the length of a zip line; monitoring the height, tension, and/or occupancy of a zip line; communicating the height, tension, and/or occupancy of a zip line to the tower; modifying the zip line to ensure participants do not touch the ground while they are travelling along the zip line; and modifying the zip line so that participants are brought to a point where they can safely detach from the zip line, by way of lowering the zip line height or tension so that the participant's feet touch the ground or platform.

A temporary zip line anchor that may rely on planar friction (such as that with the ground) to maintain zip line length and tension.

A method of slowing zip line participants through the use of a series of springs (metal, polymer, or air) placed along the zip line cable without any sort of additional weights. A system in which the springs compress coaxially with the zip line cable, but also deflect laterally, such that they cause friction with the cable, which dampens the system. A system in which a carrier block is placed so it travels along the zip line, and is connected by way of a cable, cable and pulley system, or hose to an external braking system, which external braking system could be comprised of both linear and radial springs and dampers, where these springs could be made from metal, polymer, or air systems, and where these dampers could be made from fluid flow, rotational or linear friction, or electrical eddy current systems.

A method of measuring tension within a rope or cable without introducing any item in series with the cable, which system may be constructed such that the cable is routed over a pulley, such that the cable approaches and leaves in parallel paths. This pulley is connected to a measurement device such as a scale or transducer that reads out some multiple of the actual cable tension. A similar system where the cable approach and exit are not parallel, but at some known angle producing a known multiple of the internal tension.

A program that uses a numerical iterative solver to predict the velocity and position of a zip line participant or rider.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through the use of the accompanying drawings in which:

DETAILED DESCRIPTION OF THE PREFERRED EMBODIMENTS

Figure 1:
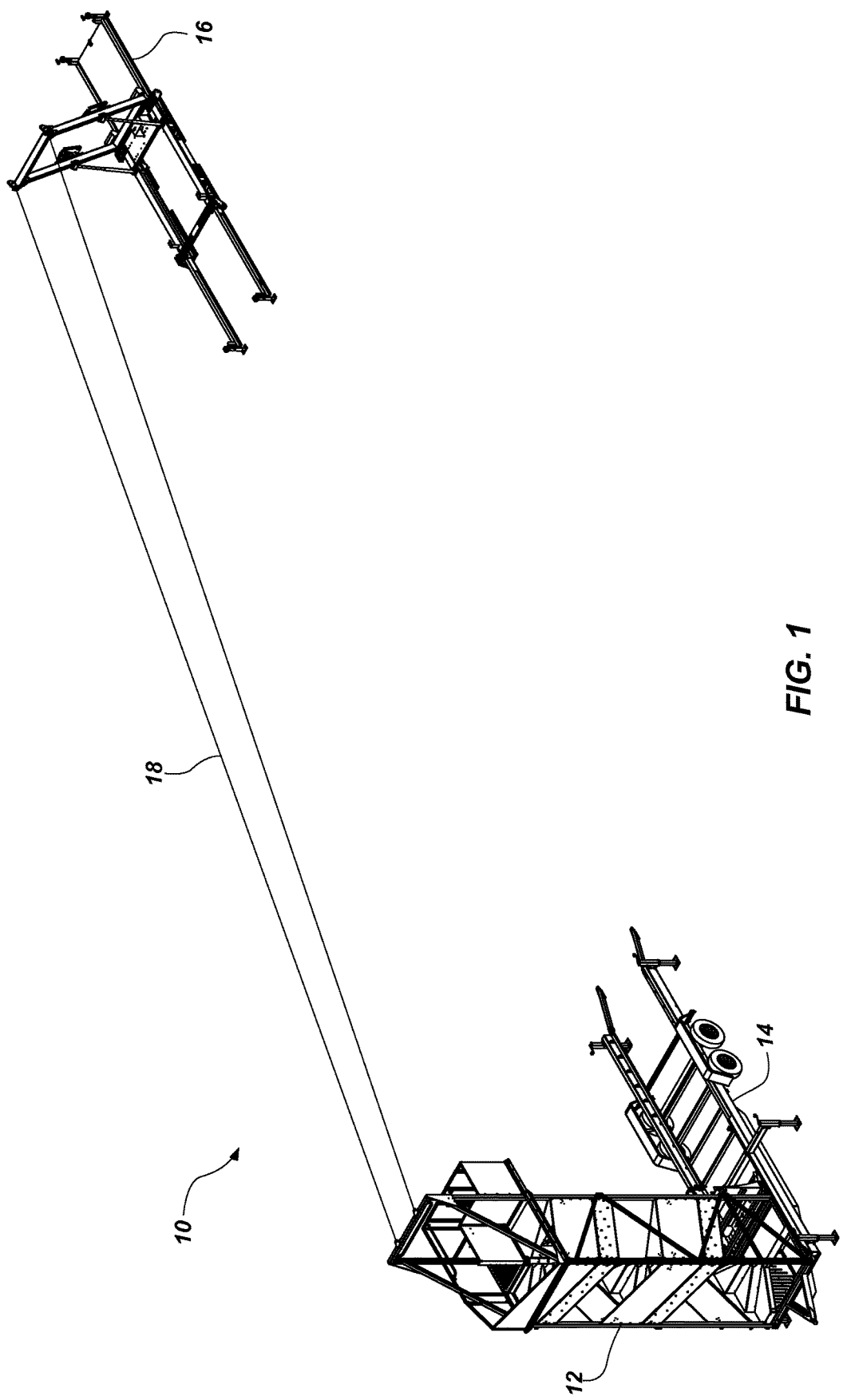
FIG. 1 is a perspective view of a zip line system.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIG. 1, one embodiment of a zip line system 10 is shown with a tower 12 connected to a trailer 14 with the tower 12 in an upright position. A temporary anchor 16 is also shown. A cable 18 is shown connected between the tower 12 and the temporary anchor 16. A zip line system 10 may include four sub-assemblies, a tower 12, a trailer 14, a temporary anchor 16, and a tension measuring device 100.

Figure 2A:
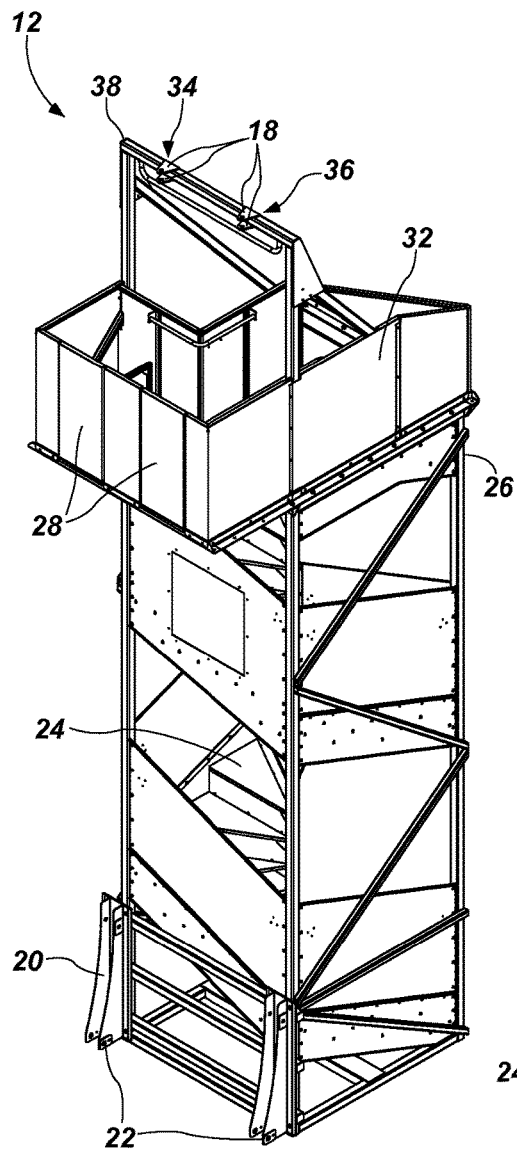
FIG. 2a is a perspective view of a tower.
Figure 2B:
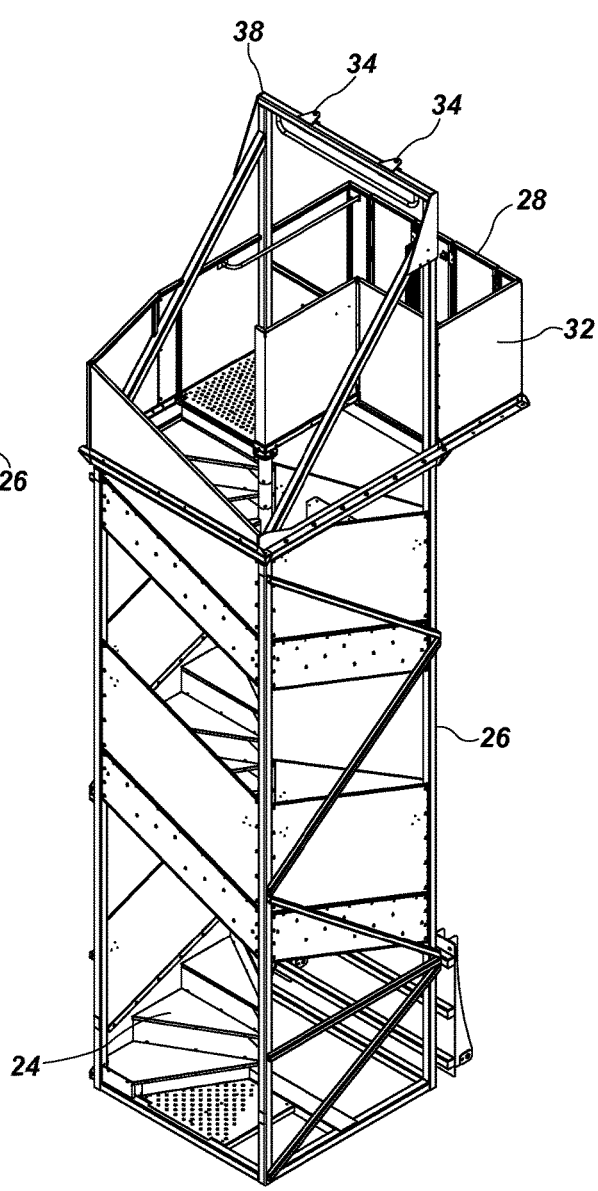
FIG. 2b is a rear perspective view of the tower.

Referring to FIGS. 2a and 2b, one embodiment of a tower 12 is depicted showing the tower 12 from two separate views that may be considered the front and back of the tower 12. The tower 12 may include a tower frame 26 providing the primary structural component of the tower 12. The tower brace 20 and the tower clevis 22 may be attached to the tower frame 26 at the bottom of the tower 12. The tower frame 26 may include a staircase 24 within the tower frame 26 and the staircase 24 leads from the bottom of the tower 12 to the platform 30 of the tower 12. The staircase 24 is generally configured as a spiral staircase and may allow participants to walk up to the platform 30 at the top of the tower 12. The platform 30 is generally surrounded by a tower skirt 32. The tower skirt 32 may include at least one door 28 that provides an exit from the platform 30. The topmost part of the tower 12 may include a tower strut 38. The tower strut 38 may include a tower brace 34 that may allow for a tower connection 36 with a cable 18. One embodiment of a tower connection 36 is also shown more particularly in FIG. 9.

In one embodiment, a door 28 may be held closed by electronically actuated locks (not shown), which may be controlled by one or more buttons (not shown) on the tower 12. Buttons on a tower 12 may be connected to a system on a temporary anchor 16. Such a system helps make sure that the base of the zip line is in operating position. Such a system also helps make sure that a participant may not exit the tower 12 before the zip line system 10 is ready, thereby preventing accidents.

Figure 3:
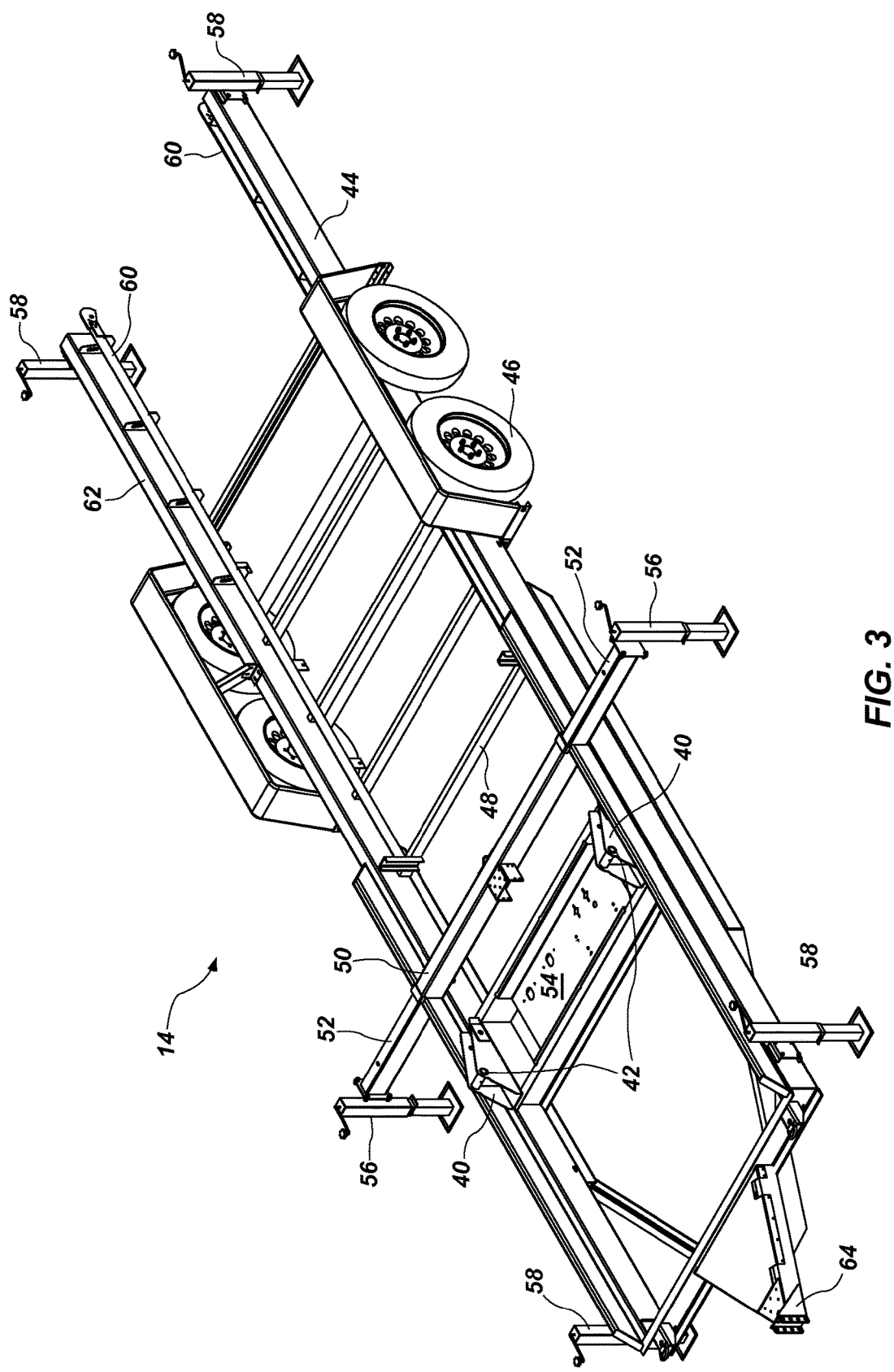
FIG. 3 is a perspective view of a trailer.

Referring to FIG. 3, one embodiment of a trailer 14 is depicted. The trailer 14 may include a trailer frame 44 providing the primary structural component of the trailer 14. The trailer frame 44 may include one or more trailer supports 48 connected to the trailer frame 44.

Figure 12A:
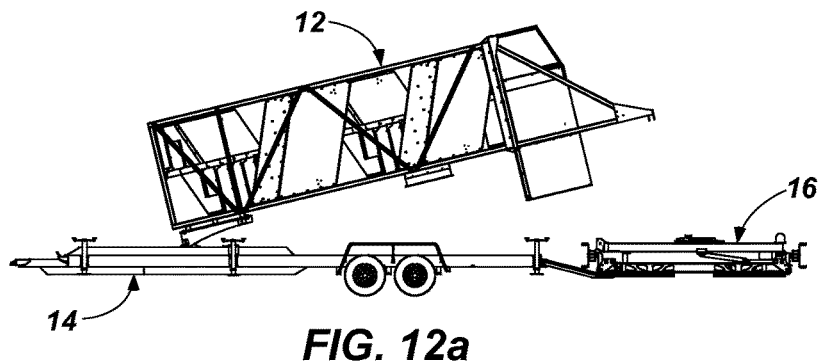
FIG. 12a is a side elevation view of a zip line system with a temporary anchor prepared for loading on a trailer.

The trailer frame 44 may include trailer ear brackets 40 having trailer ear journals 42 attached to the trailer frame 44 and providing a connection means for connecting the tower 12 to the trailer 14 (as shown in FIG. 12a). A tower 12 may be connected to a trailer 14, such that it can be raised or lowered. A tower 12 may be pivotally connected to a trailer 14 by connecting a tower clevis 22 to a corresponding trailer ear bracket 40 such that the tower 12 can be pivoted into an operational position or lowered for transport. The trailer 14 may include trailer wheels 46. The trailer 14 may include a trailer cross-beam 50 including one or more beam extensions 52. A beam extension 52 may have a beam jack 56 connected on one end. The trailer 14 may include a trailer box 54. The trailer 14 may include one or more trailer jacks 58, generally connected to the trailer frame 44 at the corners of the trailer 14. The trailer 14 may include a trailer hitch 64.

The trailer 14 may include at least two anchor tracks 60. Generally, one anchor track 60 will be connected to the inside of the trailer frame 44 toward the rear of the trailer 14. The anchor track 60 may support a temporary anchor 16 when loaded onto the trailer 14 (as shown in FIG. 12c).

Figure 4:
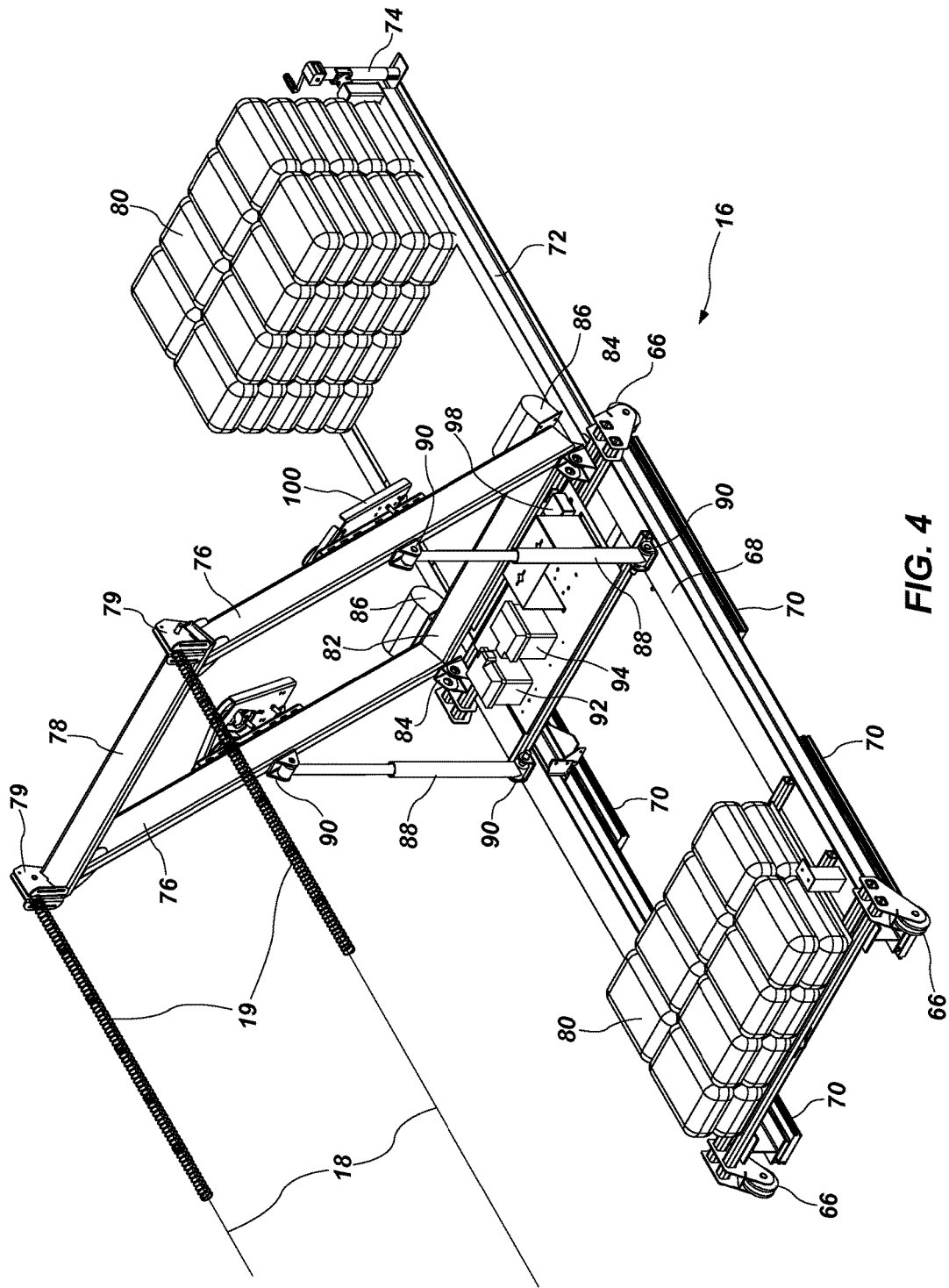
FIG. 4 is a perspective view of a temporary anchor.

Referring to FIG. 4, one embodiment of a temporary anchor 16 is depicted. A temporary anchor 16 may include an anchor frame 68. An anchor frame 68 may have anchor wheels 66 connected to the anchor frame 68, generally at the corners of the anchor frame 68. A set of anchor wheels 66 may match up to an anchor track 60 on a trailer 14. When a temporary anchor 16 is being loaded onto a trailer 14 for transport, the temporary anchor 16 may be put into a transport position (see also, FIG. 6a and FIG. 12).

An anchor frame 68 may have anchor skids 70 connected to the anchor frame 68, generally on the underside of the anchor frame 68. Anchor skids 70 may be made of rubber and provide a high-friction surface.

An anchor frame 68 may include an anchor extension 72 extendable from one side of the anchor frame 68. An anchor extension 72 may include at least one extension jack 74, generally connected to a corner of the anchor extension 72. Counterweights 80 may be placed on the anchor frame 68, an anchor extension 72, or both. Counterweights 80 may include sand bags, concrete blocks, water barrels, or the like. Counterweights may not be required in other configurations.

A temporary anchor 16 may include at least one anchor arm 76, an anchor strut 78, and an anchor beam 82. An anchor beam 82, an anchor strut 78, and two anchor arms 76 may be connected in the configuration of a square or rectangle. An anchor arm 76, an anchor strut 78, and an anchor beam 82 structure may be pivotally connected to the anchor frame 68 by means of an anchor clevis 84. At least one hydraulic ram 88 may be pivotally connected to the anchor frame 68 and an anchor arm 76 by means of a ram clevis 90 connected to both the anchor frame 68 and the anchor arm 76 and located at each end of a hydraulic ram 88. A temporary anchor 16 may be raised hydraulically. An anchor strut 78 may include at least one anchor brace 79.

The cable 18 may include at least one spring 19 on the cable 18 and near or proximate an anchor brace 79. A spring 19 may be made from steel, but that is not integral to the design and it could be modified to use polymer or air springs. A spring 19 may be inside a flexible cover. This may allow each spring to function independently of its neighboring springs, while making sure the total spring pack extends no farther than the length of the cover.

A series of springs may be concentric with the cable 18 and be designed to safely slow a participant to a stop. Upon impact, these springs compress along the axis of the cable, but also deflect laterally. This lateral deflection causes the spring to rub against the cable, creating friction. This acts as a dampening force on the system, and the two forces (spring force and friction) together create a smooth deceleration for a large variety of participant weights.

Figure 15:
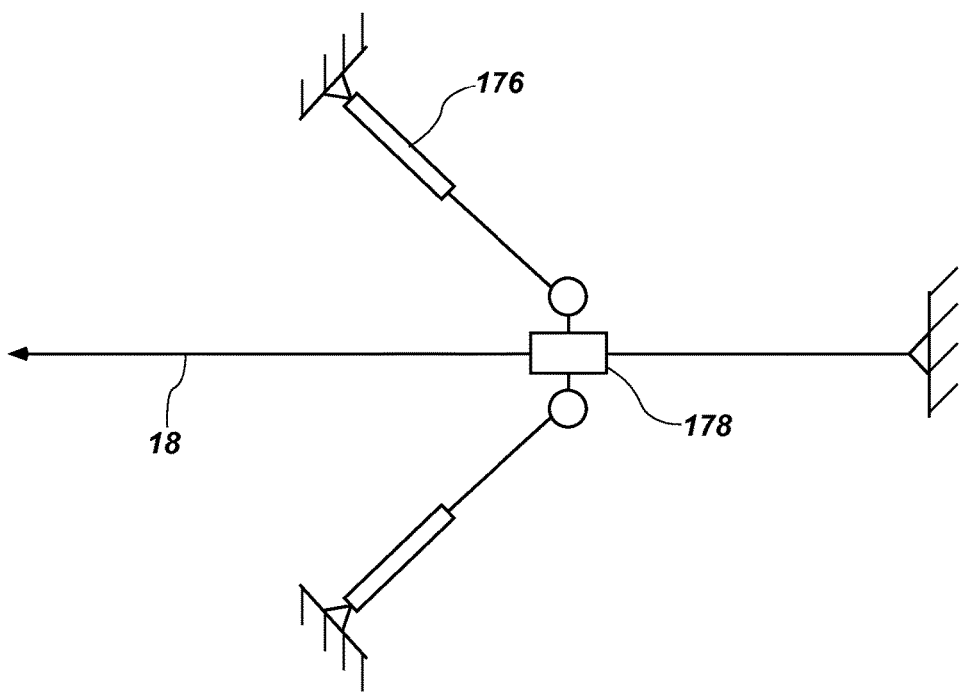
FIG. 15 is a schematic diagram of a braking system.

Referring to FIG. 15, another way to slow riders would be to attach a slowing mechanism 176 to an external anchor and an impact block 178 placed on the cable 18. Such a slowing mechanism 176 could take many forms. A slowing mechanism 176 may be an air spring, steel spring, hydraulic system, or magnetic system attached to an anchor by way of a heim joint (also known as a rose joint or rod end joint), chain, cable, or rope, with the other end similarly connected to the impact block 178.

A temporary anchor 16 may include at least one winch 86 connected to an anchor arm 76. A winch 86 allows zip line system 10 operators to quickly adjust the tension in the cable 18, or zip line, including during set-up. A winch 86 may bring a cable 18 to a safe tension.

A temporary anchor 16 may include a battery 92. A temporary anchor 16 may include a pump 94. A temporary anchor 16 may include a systems control housing 96. A temporary anchor 16 may include a proximity sensor 98. A battery 92, a pump 94, and a systems control housing 96 may be located on the anchor frame 68.

A temporary anchor 16 may include a tension measuring device 100. A tension measuring device 100 may connected to an anchor arm 76.

Figure 5:
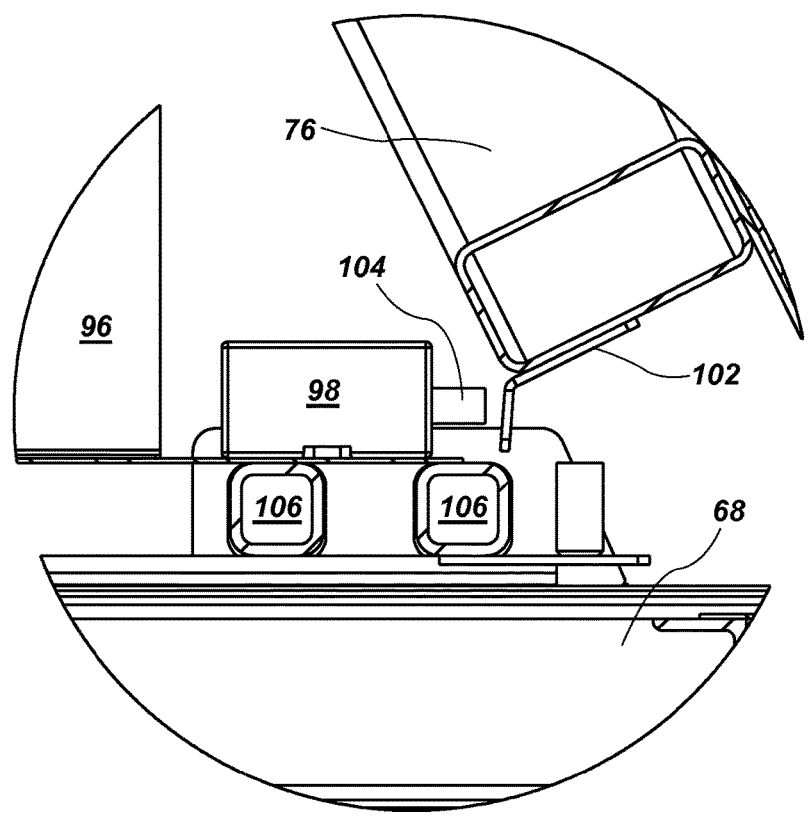
FIG. 5 is a side elevation view of a portion of a temporary anchor.

Referring to FIG. 5, one embodiment of structures proximate the pivotal connection between an anchor frame 68 and an anchor arm 76 on a temporary anchor 16 is depicted. A temporary anchor 16 may include a plate 102 (or backstop 102) that retains an anchor arm 76 or an anchor beam 82. A proximity sensor 98 may include a proximity switch 104. At least one anchor support 106 may be connected to an anchor frame 68.

Figure 6A:
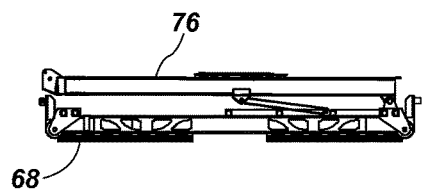
FIG. 6a is a side elevation view of a temporary anchor in a folded position.

Referring to FIG. 6, one embodiment of a temporary anchor 16 is depicted in various stages of use, or configurations. Referring to FIG. 6a, one embodiment of a temporary anchor 16 is depicted in a configuration suitable for storage or travel. An anchor arm 76 may be folded so as to be positioned substantially over an anchor frame 68.

Figure 6B:
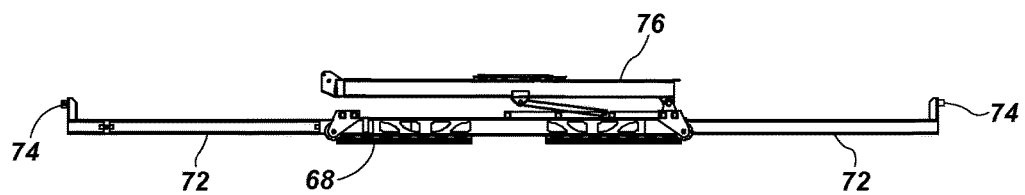
FIG. 6b is a side elevation view of a temporary anchor in an extended position.

Referring to FIG. 6b, one embodiment of a temporary anchor 16 is depicted with anchor extensions 72 extended from an anchor frame 68, with extension jacks 74 connected to the distal ends of the anchor extensions 72, and with an anchor arm 76 folded so as to be positioned substantially over the anchor frame 68.

Figure 6C:
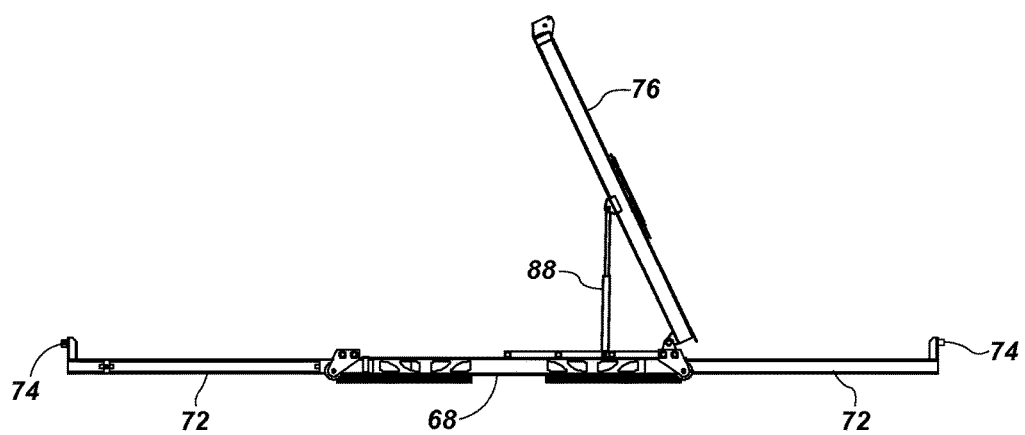
FIG. 6c is a side elevation view of a temporary anchor in a ready position.

Referring to FIG. 6c, one embodiment of a temporary anchor 16 is depicted in a configuration suitable for use in a zip line system 10. An anchor frame 68 may have anchor extensions 72 extended from opposite sides of the anchor frame 68. Each anchor extension 72 may have an extension jack 74 connected to its distal end or side. An anchor arm 76 may be extended or pivoted into a position suitable for use and at an angle from the anchor frame 68. An hydraulic ram 88 may be pivotally connected between the anchor frame 68 and the anchor arm 76.

Figure 7:
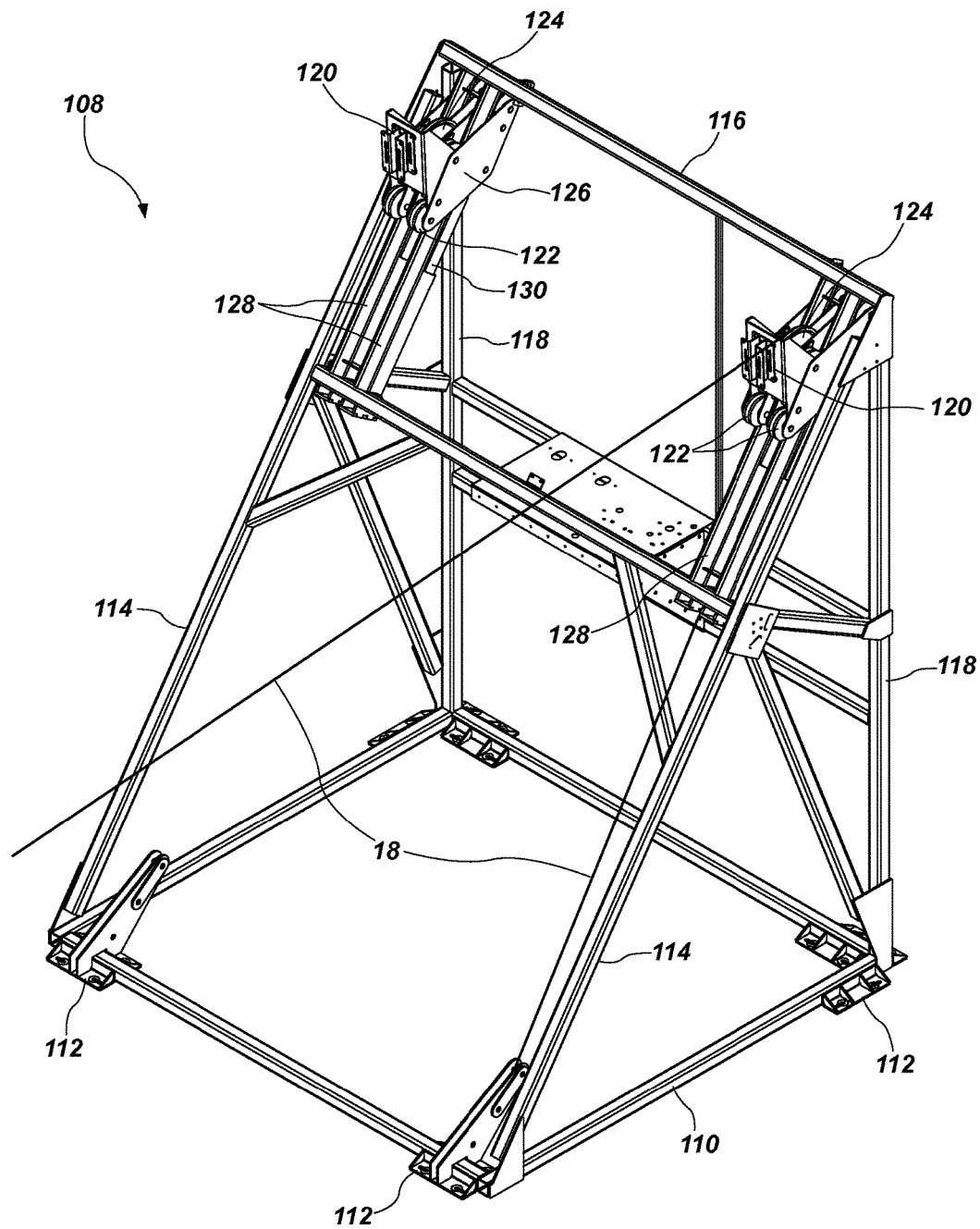
FIG. 7 is a perspective view of a fixed anchor.

Referring to FIG. 7, one embodiment of a fixed anchor 108 is depicted. A fixed anchor 108 may include a fixed anchor frame 110. A fixed anchor 108 may include at least one fixed anchor arm 114 and at least one fixed anchor pole 118 connected to the fixed anchor frame 110. A fixed anchor arm 114 and a fixed anchor pole 118 may be connected to the anchor frame 110 in the configuration of a triangle. A fixed anchor 108 may be configured to include a fixed anchor strut 116 along a top of a fixed anchor 108.

A fixed anchor 108 may include a guide structure 126. A guide structure 126 may include at least one guide wheel 122, a guide brace 120, and a guide pulley 124. The guide brace 120 and the guide pulley 124 of a guide structure 126 may be configured to allow a cable 18 to go through the guide brace 120 and around the guide pulley 124 and be secured or anchored to the fixed anchor 108 near the fixed anchor frame 110. A guide wheel 122 may be connected to the guide structure 126 in a manner that allows the guide structure 126 to move along guide rails 128.

A guide ram 130 may be connected to the guide structure 126 and the fixed anchor support 119. The guide ram 130 may enable controlled and substantially vertical movement of the guide structure 126 along the guide rails 128.

Figure 8:
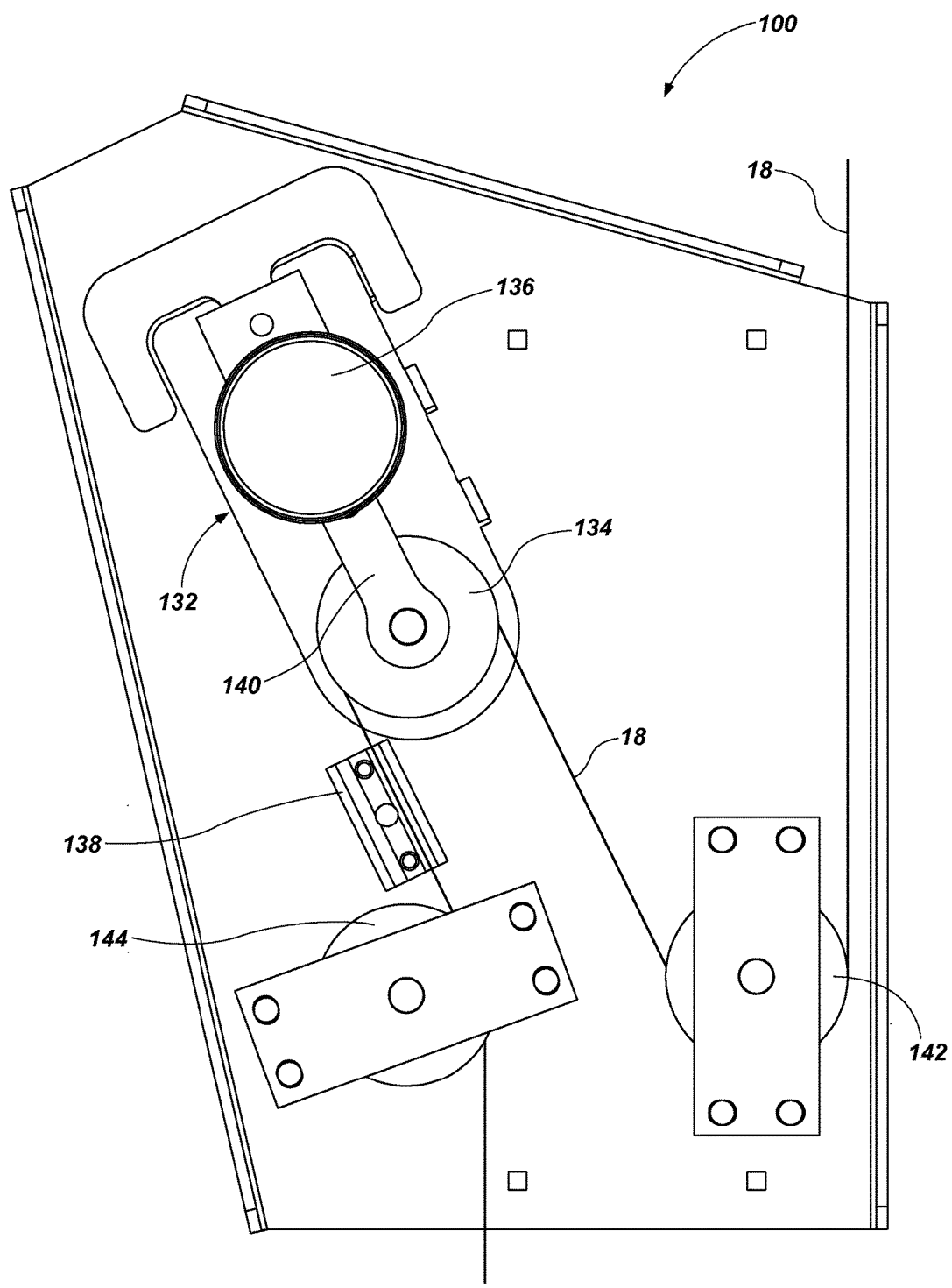
FIG. 8 is a front elevation schematic view of a tension measuring device.

Referring to FIG. 8, one embodiment of a tension measuring device 100 is depicted. A tension measuring device 100 may include a scale 132. A scale 132 may include a scale pulley 134 and a scale meter 136 and a scale arm 140. A tension measuring device 100 may include a first tension pulley 142 and a second tension pulley 144. A cable 18 may engage the first tension pulley 142 and then the scale pulley 134 and then the second tension pulley 144. A cable block 138, or block 138, may be connected to the cable 18 between the scale pulley 134 and the second tension pulley 144.

The first tension pulley 142 and the second tension pulley 144 to guide the cable 18 into the scale pulley 134 and to ensure that the cable 18 is always pulled directly away from the scale 132. The first tension pulley 142 and the second tension pulley 144 may not be required in all configurations, as these same principles could be applied to build a similar device with a single pulley. However, using the first tension pulley 142 and the second tension pulley 144 to ensure the cable 18 pulls perfectly straight on the scale gives a more accurate and consistent reading. Also, due to its configuration, this tension measuring device 100 could catastrophically fail and the cable 18 could still hold. Using a single pulley to measure the tension in the cable could allow the cable 18 to fall in the event of a failure.

The tension measuring device 100 may include a block 138 with a handle. The block 138 may act as a secondary brake, ensuring the cable 18 would remain taught in the event of a failure within a winch 86.

Figure 14:
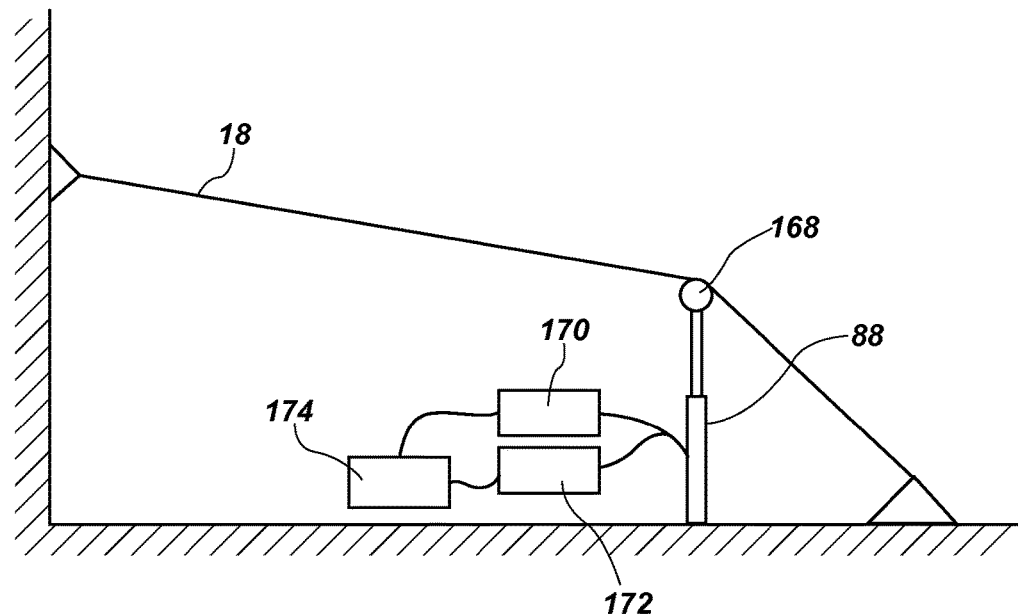
FIG. 14 is a schematic diagram of a tension measuring device.

Referring to FIG. 14, it is possible to use a digital transducer 172, or pressure transducer 172, to measure the tension, which could be fed into a basic program 174, or monitoring program 174. This program 174 could monitor the tension, as well as the height of the zip line cable 18. Then, it could automatically adjust certain parameters to ensure constant safe conditions. It would also be possible to replace the scale with a hydraulic ram 88 and a tension pulley 168 and monitor the pressure within the ram. This data could be used to figure out the tension (given a certain ram diameter). In such a configuration, the pressure could then be controlled with an outside pump 170, which could then force the ram out or in, raising or lowering the cable tension. In one embodiment, a tension measuring device as described in FIG. 14 may be used with a fixed anchor 108. An operator may monitor the pressure within the ram 88. The data obtained may be compared to safe values provided by the manufacturer, resulting in safe tensions (given the manufacturer's specified ram diameter). In this configuration, the pressure may be controlled with an outside pump (not shown), which forces the ram 88 out or in, raising or lowering the cable and its tension.

Figure 9:
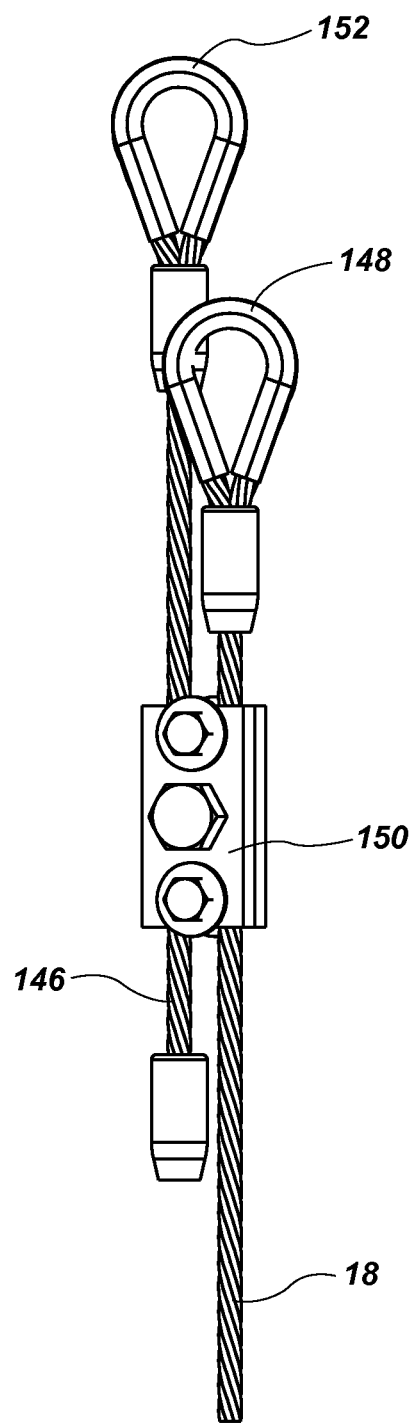
FIG. 9 is a perspective view of a cable connection end.

Referring to FIG. 9, one embodiment of a cable connection end is depicted. A cable connection end may include a cable 18 and a safety cable 146. A cable 18 may include a cable loop 148 at an end. A safety cable 146 may include a safety cable loop 152 at an end. A cable 18 and a safety cable 146 may be connected to each other using a cable clamp 150. A cable connection end as depicted and described may provide a redundancy against human error, both with respect to the manufacturing of the cable 18 and attaching it to a tower 12.

Figure 10:
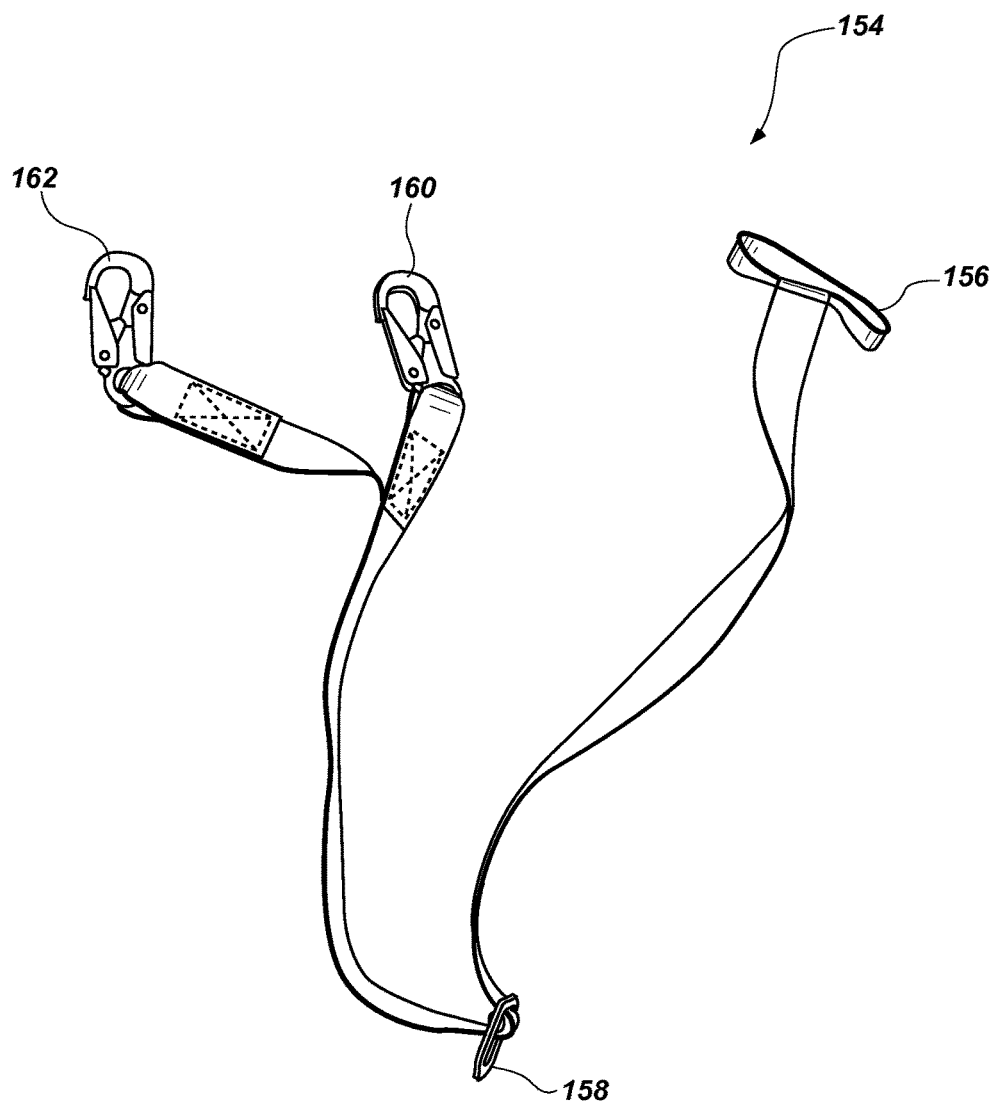
FIG. 10 is a perspective view of a lanyard.

Referring to FIG. 10, one embodiment of a lanyard 154 is depicted. A lanyard 154 may include a lanyard loop 156, or attachment point 156, at one end. A lanyard 154 may include a primary lanyard clip 162 at an end opposite the lanyard loop 156. A lanyard 154 may include a secondary lanyard clip 164 at an end opposite the lanyard loop 156. A lanyard 154 may include a lanyard adjustment device 158, or handle 158, located along the lanyard 154 between the lanyard loop 156 and both the primary lanyard clip 160 and secondary lanyard clip 162.

A lanyard may be comprised of a main body, two connecting clips (primary 162 and secondary 164) to attach to the zip line trolley, an attachment point 156 to connect it to the harness of the participant or rider, and a handle 158. The handle 158 allows a zip line operator to quickly ensure that the lanyard 154 is sized correctly for the participant or rider wearing it by simply pulling up to tighten it, or pushing the webbing of the main body through to loosen it. It is long enough that it can accommodate nearly any height of participant, and strong enough to accommodate any participant that would be allowed on the zip line. The lanyard connecting clips may be double-locking, making it more difficult for them to accidentally detach.

Referring to FIG. 11, one embodiment of a zip line system 10 is depicted in various stages of use, or configurations. Referring to FIG. 11a, one embodiment of a zip line system 10 is depicted with a rider 164 at the top of a tower 12 with a cable 18 and a spring 19 connected to a temporary anchor 16. The temporary anchor 16 is depicted in a generally upright position.

Figure 11A:
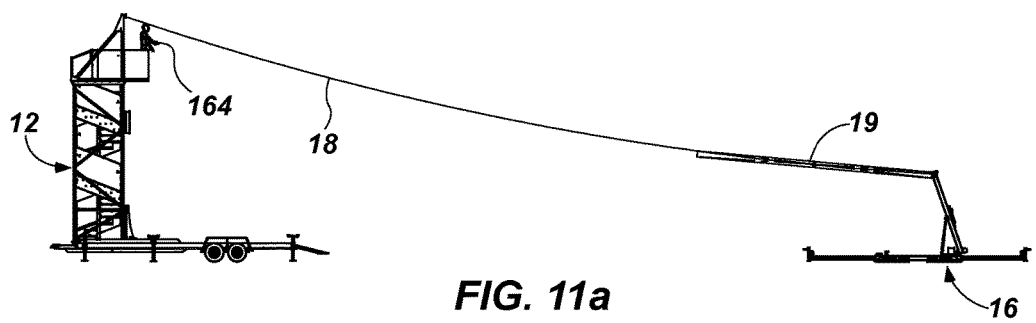
FIG. 11a is a side elevation view of a zip line system with a temporary anchor and a rider on a platform.
Figure 11B:
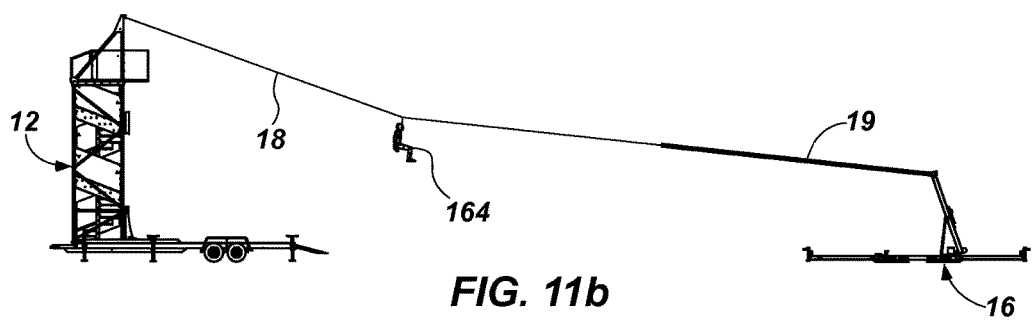
FIG. 11b is a side elevation view of a zip line system with a temporary anchor and a rider on a cable.

Referring to FIG. 11b, one embodiment of a zip line system 10 is depicted with a rider 164 connected to a cable 18 and between a tower 12 and a temporary anchor 16, and nearer the tower 12 than the temporary anchor 16. The temporary anchor 16 is depicted in a generally upright position.

Figure 11C:
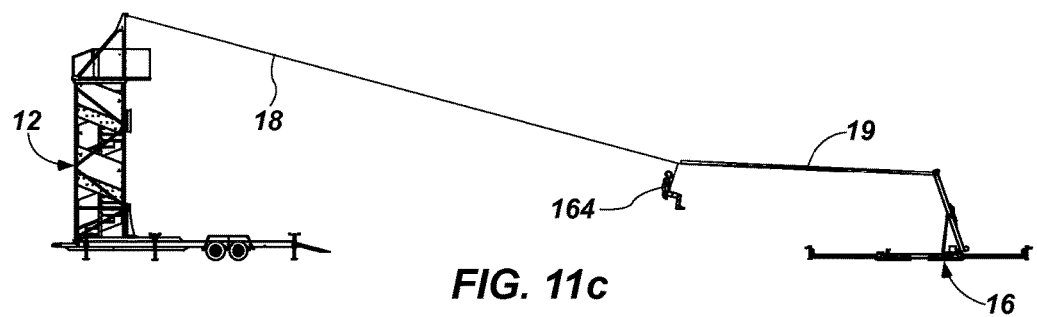
FIG. 11c is a side elevation view of a zip line system with a temporary anchor and a rider at the end of the ride.

Referring to FIG. 11c, one embodiment of a zip line system 10 is depicted with a rider 164 connected to a cable 18 and between a tower 12 and a temporary anchor 16, and nearer the temporary anchor 16 than the tower 12 and near the spring 19. The temporary anchor 16 is depicted in a generally upright position.

Figure 11D:
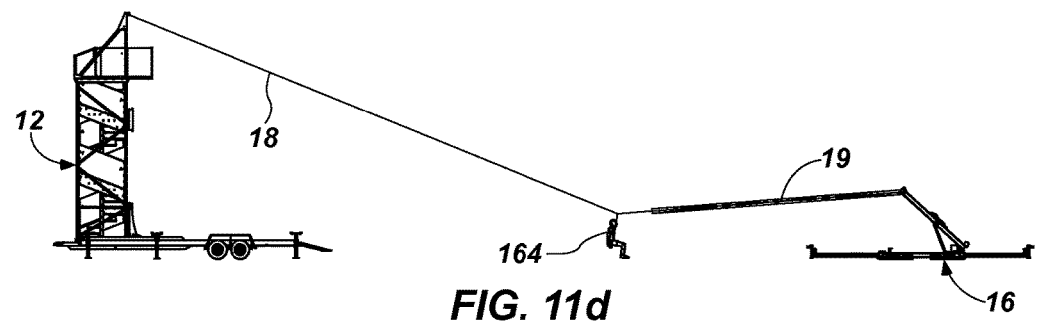
FIG. 11d is a side elevation view of a zip line system with a temporary anchor and a rider lowered to the ground.

Referring to FIG. 11d, one embodiment of a zip line system 10 is depicted with a rider 164 connected to a cable 18 and between a tower 12 and a temporary anchor 16, and nearer the temporary anchor 16 than the tower 12. The temporary anchor 16 is depicted in a somewhat lowered position. After the rider 164 has come to a stop, the temporary anchor 16 lowers the zip line cable 18, which in turn lowers the rider 164. Once their feet touch the ground, the rider 164 can then disembark from the cable 18, generally with the help of an operator.

Figure 11E:
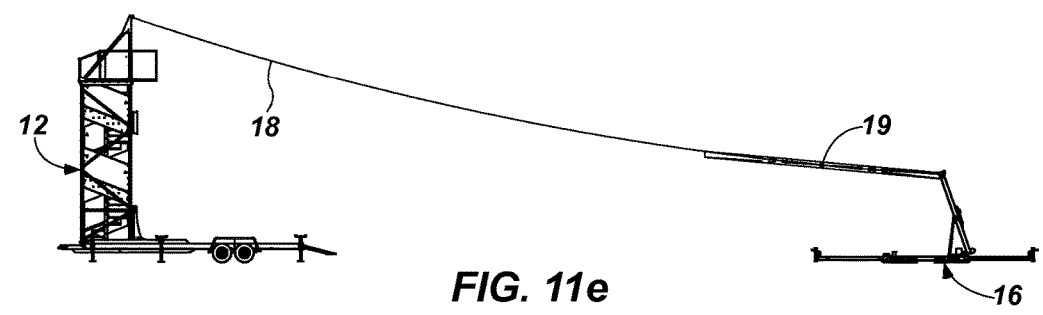
FIG. 11e is a side elevation view of a zip line system with a temporary anchor.

Referring to FIG. 11e, one embodiment of a zip line system 10 is depicted with a tower 12 with a cable 18 and a spring 19 connected to a temporary anchor 16. The temporary anchor 16 is depicted in a generally upright position. When the rider 164 is clear of the cable 18, the temporary anchor 16 then returns the zip line to its initial height for the next rider 164.

Referring to FIG. 12, one embodiment of a tower 12, a trailer 14, and a temporary anchor 16 is depicted in various stages of use, or configurations. Referring to FIG. 12a, a tower 12 is depicted connected to a trailer 14 with the tower 12 in a substantially tilted position and a temporary anchor 16 positioned at an end of the trailer 14.

Figure 12B:
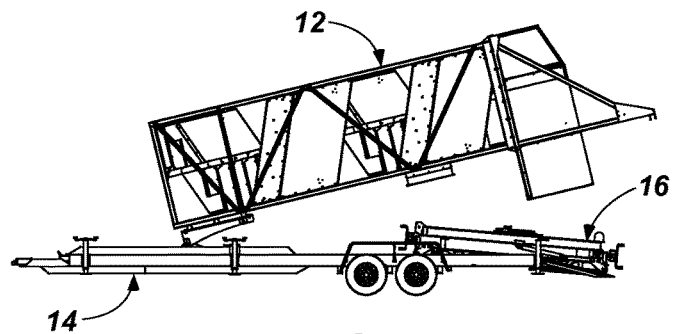
FIG. 12b is a side elevation view of a zip line system with a temporary anchor partially loaded on a trailer.
Figure 12C:
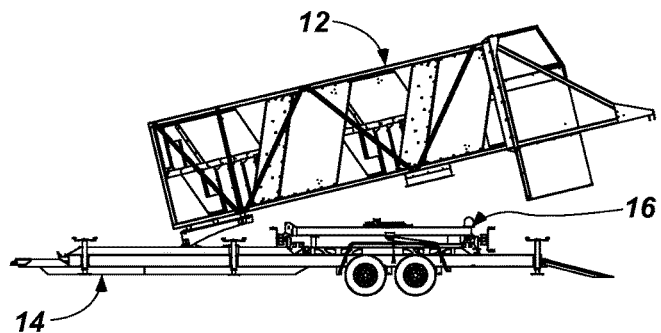
FIG. 12c is a side elevation view of a zip line system with a temporary anchor loaded on a trailer.

Referring to FIG. 12b, a tower 12 is depicted connected to a trailer 14 with the tower 12 in a substantially tilted position and a temporary anchor 16 partially loaded onto the trailer 14. The temporary anchor 16 may be pulled onto the trailer 14 along anchor tracks 60 with a winch, which pulls the temporary anchor 16 all the way onto the trailer 14. The trailer 14 may be built such that there are no trailer supports 48 in the back end, under the anchor tracks 60. This, combined with putting the anchor wheels 66 at the outermost points of the anchor frame 68, may bypass the issue of ground clearance. When loading, a majority of the temporary anchor 16 may actually be lower than the anchor track 60, which is why it may be necessary that the trailer 14 not have trailer supports 48 in the trailer's 14 back section. This process does not specifically require that there specifically be a track. There could also just be bumpers positioned to keep the temporary anchor 16 centered.

Referring to FIG. 12c, a tower 12 is depicted connected to a trailer 14 with the tower 12 in a substantially tilted position and a temporary anchor 16 loaded onto the trailer 14.

Figure 12D:
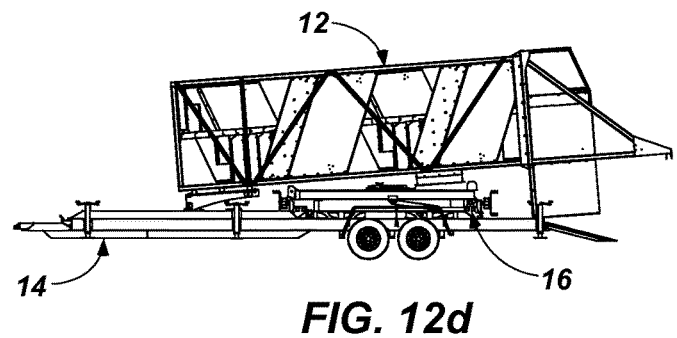
FIG. 12d is a side elevation view of a zip line system with a temporary anchor loaded on a trailer.

Referring to FIG. 12d, a trailer 14 is depicted with a temporary anchor 16 loaded onto the trailer 14 and a tower 12 connected to the trailer 14 and substantially folded over so that the tower 12 rests on the temporary anchor 16. Once the temporary anchor 16 is loaded onto the trailer 14 and the tower 12 is lowered into the travel position, the system 10 can be hooked to a truck and transported as a single trailer. It is not necessary for the whole system to be a single trailer, however. It could easily be two or more separate trailers, although such designs may introduce extra complications.

Figure 13:
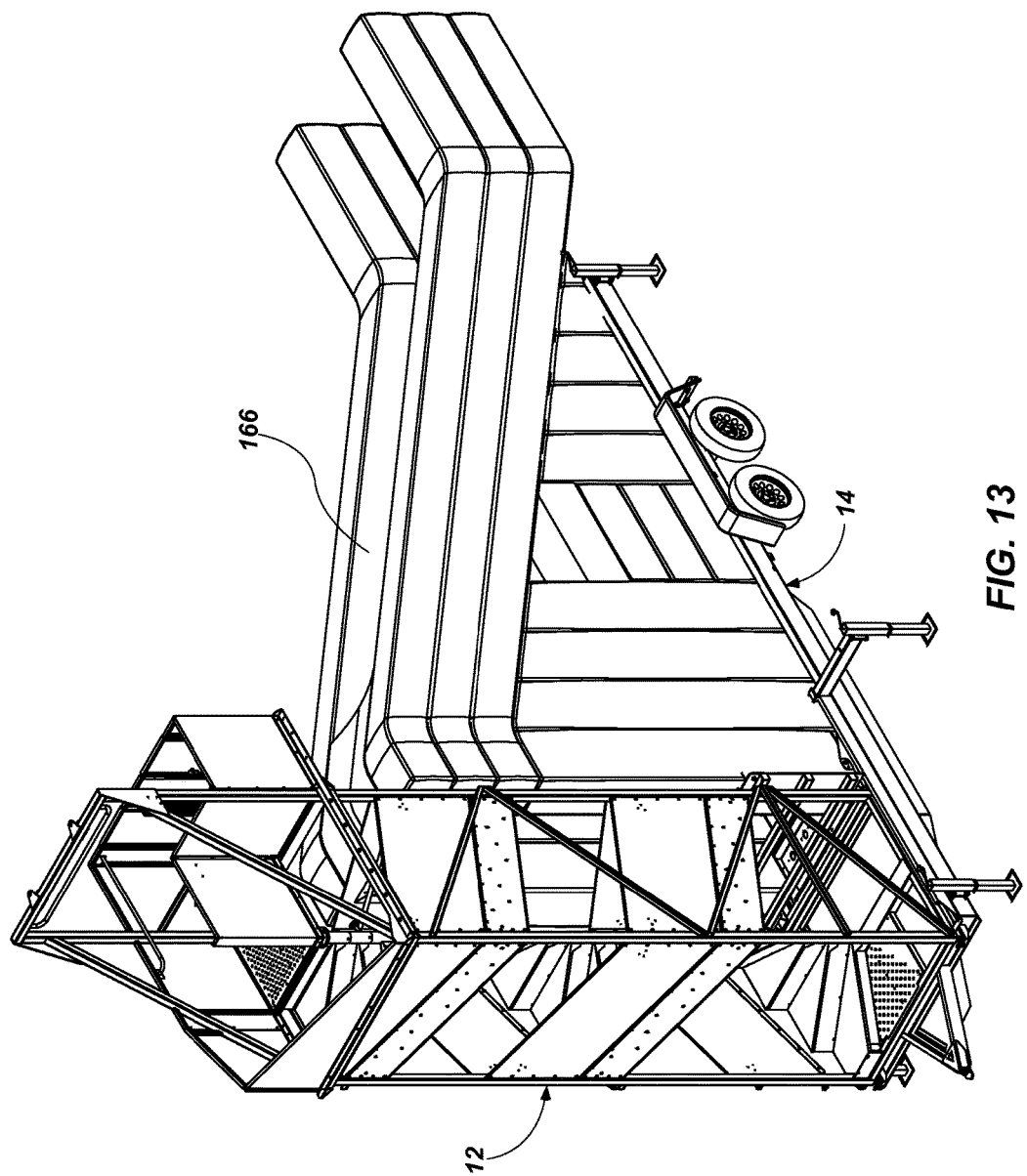
FIG. 13 is a perspective view of a zip line system tower and trailer with an inflatable slide.

Referring to FIG. 13, one embodiment of an inflatable slide 166 is depicted. An inflatable slide 166 may be positioned on a trailer 14 and next to a tower 12. The zip line system 10 may be equipped with an inflatable slide 166. The inflatable slide 166 may serve at least two functions: to act as a method of exit for participants or riders 164 who decide not to ride the zip line cable 18 after reaching the tower platform 30 (a.k.a. "chicken-outs"), and to act as a cushion in the extremely unlikely event of a person falling from the cable 18 or tower platform 30. By having multiple attractions on the single tower 12, the number of repeat riders can increase dramatically.

A program may be used to predict the top speed of a rider 164, accounting for varying heights and trolley rolling resistances. A program may be written using Octave™, which is very similar to MatLab™, a program and language based on C/C++. The program may prompt a participant or user to input the rider's frontal area (Af), mass (m), zip line change in height (O), the horizontal distance covered by the zip line (A), and the coefficient of rolling resistance (mu). The program then uses this information to calculate the length traveled (H, assuming a straight line cable), and the force exerted on the participant or rider by the cable (R). The program then uses a function for acceleration based on the exerted force (R), wind resistance, and rolling resistance. From physics we know that integral of acceleration as a function of x (distance) from $x=x_{initial}$ to $x=x_{final}$ is equal to the final velocity. Using an iterative method, the program numerically approximates the integral of the previously mentioned function.

This program could be expanded in a number of ways. One way would be to account for cable stretch due to the mass of the rider, as well as the cable itself. Given the application, it would be safe to assume that all cable stretch would be elastic, and therefore could be approximated with Hooke's law using a modulus of elasticity given by the cable manufacturer for the specific cable construction. This, combined with accounting for the rider's position within the iterative integral, would increase the overall accuracy of the program. This is especially true when the mass of the rider is significant in comparison to the mass of the cable, which is generally true for smaller zip lines.

Another way to modify this program would be to feed each and every iteration of the integral loop into a matrix. This matrix could be plotted, giving the participant's velocity at any given point along the zip line and/or the participant's position at any given time. This would require that the program account for cable stretch to be decently accurate, as cable stretch causes the participant to accelerate early in the zip line and generally slow down as they near the end.

An example of a zip line speed program is as follows:

```
clear
clc
g=9.81;
rho=1.204;
V=0;
Af=input('What is the rider frontal area (in square meters) ?');
Cd=1;
m=input('What is the rider mass (in kilograms)?');
O=input('How far do the riders drop over the length of the zipline (in meters)?');
A=input('How far is the Decelinator from the Tower (in meters)?');
H=((O^2)+(A^2))^0.5;
R=g*m*(1+(O/A));
mu=input('What is the Coefficient of Rolling Resistance?');
a=@(v) ((R*(O/A))-(R*mu)-(0.5*rho*(v^2)*Af*Cd))/m;
Iterations=1000;
C1=0;
C2=0;
V=0;
for x=1:Iterations
C1=2*a(V)*(H/Iterations)
C2=C2+C1
V=C2^0.5
end
Vmph=2.2369*V
clc
fprintf('The rider will be going %.1f m/s which equals %.1f mph when they contact the \nDecelinator\n', V, Vmph);
```

In one embodiment, a tower may be affixed to a trailer, a spiral staircase may be within the tower, cables may function as the zip line, a portable or temporary anchor may be used for immobilizing the lower zip line attachment point, a system may be used to vary the height of the zip line, a system may be used to vary the tension of the zip line, a system may be used to monitor the tension of the zip line, a system may be used to communicate safety conditions to the tower, and lanyards may be used to attach participants or riders to trolleys that roll along the zip line.

In one embodiment, an inflatable slide may act as an alternative exit for participants from the zip line tower, as well as acting as a backup pad for participants in the case of some form of failure of the cable. All of these systems are configured so that it is safe and relatively simple to assemble, use, disassemble, and transport within a reasonable period.

What is claimed and desired to be secured by United States Letters Patent is:

1. A method for using a zip-line comprising:
    providing a tower having a first height and a platform proximate the first height, wherein the tower is hingedly mounted on a trailer to move the tower between a first, stowed position and a second, deployed position;
    providing an anchor having a second height lower than the first height;
    connecting a cable between the tower and the anchor wherein the cable has a first length and a height;
    providing a trolley that can roll along the cable between the tower and the anchor;
    providing a lanyard connected to the trolley;
    connecting a rider on the platform to the lanyard;

rolling a rider along the cable from the platform to the anchor by use of the trolley and the lanyard;
increasing the amount of slack in the first length of the cable; and
lowering the rider to the ground.

2. The method of claim 1 further comprising:
providing at least one spring on the cable and proximate the anchor.

3. The method of claim 1 wherein the lanyard has a length that is adjustable and at least two separate attachments to the trolley.

4. The method of claim 1 wherein the anchor is temporary and portable and further comprises an anchor arm that is pivotally connected to an anchor frame and pivotally connected to a hydraulic ram to move the anchor arm between a first, folded position and a second, upright position, wherein the hydraulic ram has a hydraulic pressure that can be measured and adjusted, and that facilitates pivoting of the anchor arm, thereby decreasing the height of the cable.

5. The method of claim 4 wherein a tension on the cable is measured using the hydraulic pressure in the hydraulic ram and the tension can be adjusted.

6. The method of claim 5 wherein the tension on the cable is adjusted by the hydraulic ram and the pivoting of the anchor arm.

7. The method of claim 4 further comprising:
folding the anchor arm into the first, folded position;
loading the anchor onto the trailer; and
pivoting the tower with respect to the trailer over the anchor and to the first, stowed position.

8. The method of claim 1 further comprising:
calculating the position along the cable of the rider; and
calculating the top speed of the rider.

9. The method of claim 1 further comprising:
providing an inflatable slide between the tower and the anchor and proximate the tower.

10. A method for using a zip-line comprising:
providing a tower having a first height and a platform proximate the first height;
providing a temporary and portable anchor having a second height lower than the first height, wherein the temporary anchor further comprises an anchor arm that is pivotally connected to an anchor frame and pivotally connected to a hydraulic ram to move the anchor arm between a first, folded position and a second, upright position, wherein the hydraulic ram has a hydraulic pressure that can be measured and adjusted;
connecting a cable between the tower and the anchor wherein the cable has a first length;
providing at least one spring on the cable and proximate the anchor;
providing a trolley that can roll along the cable between the tower and the anchor;
providing a lanyard connected to the trolley, wherein the lanyard has a length that is adjustable;
connecting a rider on the platform to the lanyard;
rolling a rider along the cable from the platform to the anchor by use of the trolley and the lanyard;
calculating by a program the position of the rider along the cable;
pivoting the anchor arm;
increasing the amount of slack in the first length of the cable; and
lowering the rider to the ground.

11. The method of claim 10 wherein the tower is hingedly mounted on a trailer to move the tower between a first, stowed position and a second, deployed position.

12. The method of claim 11 further comprising:
folding the anchor arm into the first, folded position;
loading the anchor onto the trailer; and
pivoting the tower with respect to the trailer over the anchor and to the first, stowed position.

13. The method of claim 10 further comprising:
calculating the top speed of the rider.

14. The method of claim 10 further comprising:
providing an inflatable slide between the tower and the anchor and proximate the tower.

15. A method for using a zip-line comprising:
providing a tower having a first height and a platform proximate the first height, wherein the tower is hingedly mounted on a trailer to move the tower between a first, stowed position and a second, deployed position;
providing a temporary and portable anchor having a second height lower than the first height, wherein the temporary anchor further comprises an anchor arm that is pivotally connected to an anchor frame and pivotally connected to a hydraulic ram to move the anchor arm between a first, folded position and a second, upright position, wherein the hydraulic ram has a hydraulic pressure that can be measured and adjusted;
connecting a cable between the tower and the anchor wherein the cable has a first length;
providing at least one spring on the cable and proximate the anchor;
providing a trolley that can roll along the cable between the tower and the anchor;
providing a lanyard connected to the trolley;
connecting a rider on the platform to the lanyard;
rolling a rider along the cable from the platform to the anchor by use of the trolley and the lanyard;
measuring the tension on the cable using the hydraulic pressure in the hydraulic ram;
pivoting the anchor arm to adjust the tension on the cable;
calculating by a program the top speed of the rider;
pivoting the anchor arm;
increasing the amount of slack in the first length of the cable; and
lowering the rider to the ground.

16. The method of claim 15 wherein the lanyard has a length that is adjustable.

17. The method of claim 16 further comprising:
providing an inflatable slide between the tower and the anchor and proximate the tower.

18. The method of claim 15 further comprising:
folding the anchor arm into the first, folded position;
loading the anchor onto the trailer; and
pivoting the tower with respect to the trailer over the anchor and to the first, stowed position.

* * * * *